United States Patent [19]

Chau

[11] Patent Number: 5,761,466
[45] Date of Patent: Jun. 2, 1998

[54] SOFT PROGRAMMABLE SINGLE-CYCLE/ PIPELINED MICRO-PROGRAMMED CONTROL SYSTEM

[75] Inventor: Kwok Chau, Los Altos, Calif.

[73] Assignee: LSI Logic Corporation, Milpitas, Calif.

[21] Appl. No.: 239,983

[22] Filed: May 9, 1994

[51] Int. Cl.[6] ................................................. G06F 13/00
[52] U.S. Cl. ....................... 395/376; 395/377; 395/379; 348/721
[58] Field of Search .......................... 364/514 A, 514 B, 364/514 C, 514 R, 705.05, 724.13; 348/720, 721, 474, 491, 521, 537, 552, 584; 395/200, 375, 376–379, 551, 553, 559, 800, 287

[56] References Cited

U.S. PATENT DOCUMENTS

| | | | |
|---|---|---|---|
| 4,760,518 | 7/1988 | Potash et al. | 395/287 |
| 4,939,575 | 7/1990 | Childers | 348/721 |
| 5,006,980 | 4/1991 | Sanders et al. | 364/200 |
| 5,136,696 | 8/1992 | Beckwith et al. | 364/DIG. 1 |
| 5,359,718 | 10/1994 | Phillips et al. | 395/375 |
| 5,428,810 | 6/1995 | Barkans et al. | 395/551 |
| 5,430,884 | 7/1995 | Beard et al. | 395/800 |
| 5,471,607 | 11/1995 | Garde | 395/559 |

Primary Examiner—Emanuel Todd Voeltz
Assistant Examiner—Hal D. Wachsman
Attorney, Agent, or Firm—Oppenheimer, Wolff & Donnelly LLP

[57] ABSTRACT

A control system operates in a pipelined mode for executing multiple clock cycle instructions and in an open loop mode for executing single clock cycle instructions. A plurality of electrical functional units are capable of executing single clock cycle instructions and multiple clock cycle instructions that are individually addressed and applied thereto by a processor. The functional units generate current operational statuses after each clock cycle. A status indicator applies new operational statuses of the functional units to the processor. A status memory stores previous operational statuses of the functional units. A control unit controls the status indicator to apply the previous operational statuses to the processor as the new operational statuses after one of the single clock cycle instructions has been applied to the functional units. The control unit further controls the status indicator to apply the current operational statuses to the processor as the new operational statuses after one of the multiple clock cycle instructions has been applied to the functional units. In this manner, the single cycle instructions do not go through the pipeline, and their propagation times are not limited by the pipeline latency.

9 Claims, 8 Drawing Sheets

FIG. 1A PRIOR ART

PIPELINING

PARALLELISM

| O[4] | D[10] | C[6] | S[5] | X[1] | I[1] | A[1] | B[1] | Z[2] | a[6] | b[6] | r[6] | W[1] | Y[3] | • | • |

O = OPCODE
D = DATA
C = CONTROL REGISTER
S = STATUS
X = ALU
I = CARRY IN
A = A MUX

B = B MUX
Z = SHIFT
a = A ADRESS
b = B ADRESS
r = DESTINATION ADRESS
W = WRITE
Y = BUS

FIG. 8

| | | |
|---|---|---|
| cont | CONTINUE | PC = PC+ |
| cri_p | CONDITIONAL CONTINUE | PC = PC + IF COND,<br>PC = PC OTHERWISE |
| lctr | LOAD LOOP COUNTER | PC = PC+, CTR = BUS DATA |
| loop | LOOP | CTR = CTR - & PC = PC+ IF CTR = 0,<br>PC = @ DATA OTHERWISE |
| jmp | JUMP | PC = @ DATA |
| j_q | CONDITIONAL JUMP | PC = @ DATA IF COND,<br>PC = PC + OTHERWISE |
| j_eq | CONDITIONAL JUMP ESCAPE | PC = @ DATA, RESET STACK IF COND,<br>PC = PC + OTHERWISE |
| j_nq | INVERSE CONDITIONAL JUMP | PC = PC + IF COND,<br>PC = @ DATA OTHERWISE |
| dm_p | DISPATCH | PC = @ MAP (INSTR) IF COND,<br>PC = PC OTHERWISE |
| call | CALL | PC = @ DATA, STACK = PC + |
| ca_p | CONDITIONAL CALL/WAIT | PC = @ DATA & STACK = PC + IF COND,<br>PC = PC OTHERWISE |
| ca_q | CONDITIONAL CALL | PC = @ DATA & STACK = PC + IF COND,<br>PC = PC OTHERWISE |
| rtn | RETURN | PC = STACK |
| rt_p | CONDITIONAL RETURN/WAIT | PC = STACK IF COND,<br>PC = PC OTHERWISE |
| rt_q | CONDITIONAL RETURN | PC = STACK IF COND,<br>PC = PC + OTHERWISE |
| rt_nq | INVERSE CONDITIONAL RETURN | PC = PC + IF COND,<br>PC = STACK OTHERWISE |

FIG. 9

SOFT PROGRAMMABLE SINGLE-CYCLE/ PIPELINED MICRO-PROGRAMMED CONTROL SYSTEM

BACKGROUND OF THE INVENTION

1. Field of the Invention

The present invention generally relates to the art of control systems, and more particularly to a single-cycle/ pipelined control system for video processing or the like.

2. Description of the Related Art

An ongoing need exists to provide faster systems capable of processing more information in a given amount of time, or capable of controlling faster underlying target applications. Faster systems are desirable in many target applications, such as in high definition television (HDTV) where a high volume of digital information must be processed in a short time, and where a multitude of system elements, such as a video display, must be coordinated with other system elements in a complicated manner.

High definition television is just one of many target applications in which a large volume of digital information must be processed in a short time and/or a significant number of components must be coordinated in a complicated manner. However, several problems are encountered in providing faster control system devices for complex target applications, which are generally implemented using digital signal processing and a system clock to synchronize the flow of information.

In general, the number of instructions which can be processed by a digital processing system is limited by the frequency of the system clock. The frequency of the system clock is in turn limited by the time-delay in the critical path of the digital processing system.

Figure 1A:
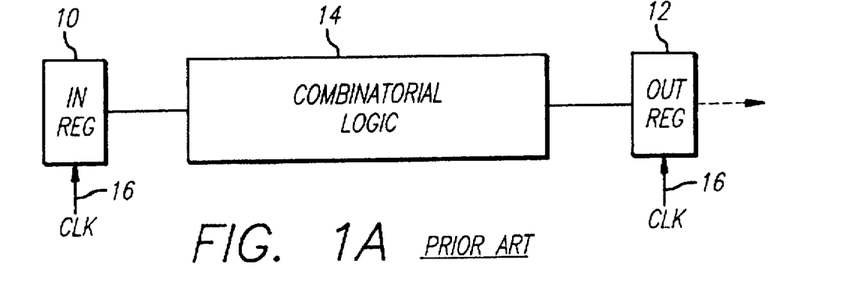
FIG. 1A shows the use of combinatorial logic circuitry to transform digital input signals into digital output signals in accordance with the prior art.

Referring to FIG. 1A, each of the many paths in a digital processing system includes combinatorial logic (CL) circuitry 14 which transforms digital input signals into digital output signals. Any given input signal takes a finite amount of time to propagate through the combinatorial logic circuitry (the path) before it appears as an output signal. This finite time is known as the propagation delay for the path. The critical path is the path in the digital processing system which has the longest propagation delay.

Usually, registers such as input register 10 and output register 12 are included in the digital processing system to capture and hold digital information at a given time indicated by a pulse from the system clock 16. If the propagation delay of the critical path in the combinatorial logic 14 is greater than the time between clock pulses arriving at registers 10 and 12, then register 12 will not capture valid output data on the next clock pulse.

This means the clock frequency is too high and the processing system will not operate properly. The obvious solution is to decrease the clock frequency, which adversely slows down the system. Two other methods, known as pipelining and parallelism, are conventionally used in order to increase the processing speed of the digital processing system without reducing the clock frequency.

Figure 1B:
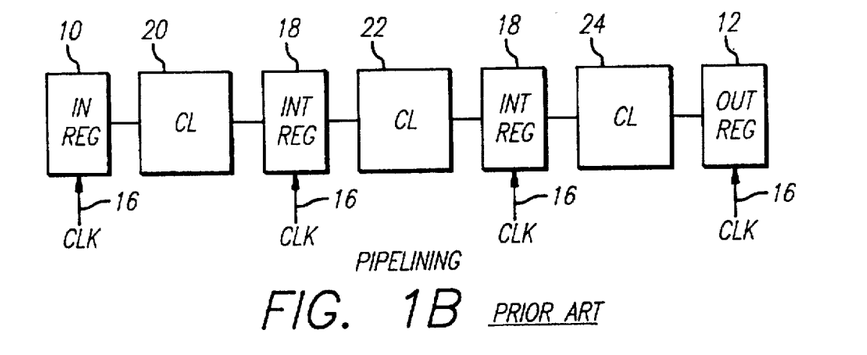
FIG. 1B illustrates the use of pipelining to increase clock speed in accordance with the prior art.

In pipelining, intermediate registers 18 are inserted in the critical path as shown in FIG. 1B to store intermediate results. This effectively shortens the critical path to the longest propagation delay in any one of the pipelined combinatorial logic circuits 20, 22 or 24. The system clock frequency can be increased since the critical path delay has been decreased by using registers 18 to capture intermediate digital results. The processing speed of the system is therefore increased. This concept will be further described below in conjunction with existing pipelined control systems.

Figure 2A:
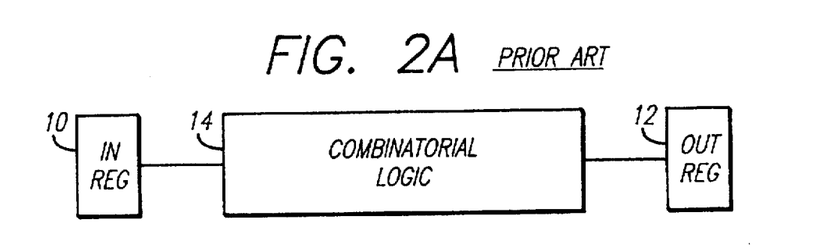
FIG. 2A presents the use of combinatorial logic in combination with parallel processing, or parallelism, in accordance with the prior art.
Figure 2B:
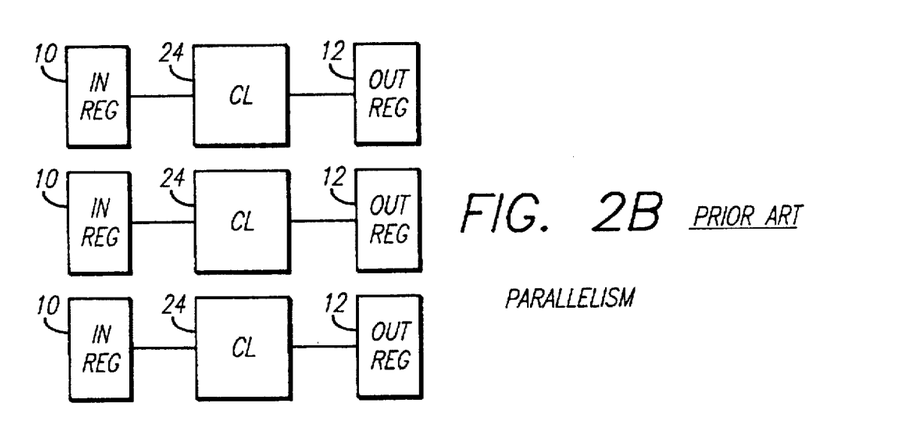
FIG. 2B presents the use of parallelism to increase the throughput and/or clock speed of a digital system in accordance with the prior art.

Using parallelism, as shown in FIGS. 2A and 2B, processing functions that are independent of one another can be operating simultaneously on the same clock cycle. This likewise increases the processing speed of the system since many processing operations are carried out at once, rather than one at a time. This concept has been incorporated into the design of digital processing devices which make use of pipelined control systems to operate a number of functional units arranged in parallel.

The concepts of latency and throughput of a digital signal processing device, which indicate processing speed, can now be explained with reference to FIGS. 1A, 1B, 2A and 2B. Latency is explained with reference to FIG. 1B. At the beginning of a task, digital information (data) is loaded into register 10 on the first clock pulse. Valid digitally processed information will be "clocked into" the succeeding register 18 on the next (second) clock pulse, while at the same time new digital information is loaded into register 10. On the third clock pulse, digitally processed information is again passed one register to the right, so that both registers 18 contain valid data, and register 10 accepts new input data.

A pipeline thus operates in "bucket brigade" fashion, passing processed or unprocessed data one register further along the pipeline on each clock cycle. Latency is the time it takes for processed data to appear at an output of the pipeline starting from the time data was first input into the pipeline. In FIG. 1B, the latency of this pipeline would be the time needed to complete three clock cycles.

Throughput is the amount of data processed by the digital processing system in a given amount of time, usually measured in millions of instructions per second or in millions of bits per second. Note that both parallelism and pipelining may be used to increase throughput. However, latency represents a delay in receiving output data and may be a concern in some target applications, thus limiting the use of pipelining. The use of parallelism is also limited whenever functions necessary to implement the target application are not independent of each other.

In modern digital processing devices the concepts of pipelining and parallelism have been applied to target applications which use many different types of functional units in place of the combinatorial logic circuitry of FIGS. 1A, 1B, 2A and 2B. For example, a functional unit may include its own microprocessor and may perform nearly any type of generalized or specialized function relating to the target application. Each functional unit itself may also incorporate the features of pipelining and parallelism, and would thus have its own latency and a throughput characteristics.

When many functional units are utilized using pipelining, parallelism, or a combination of the two, some form of control scheme is required to coordinate the functional units within the target application. The control scheme has often taken the form of a fixed pipelined control system, as shown in FIGS. 3 and 4.

Figure 3A:
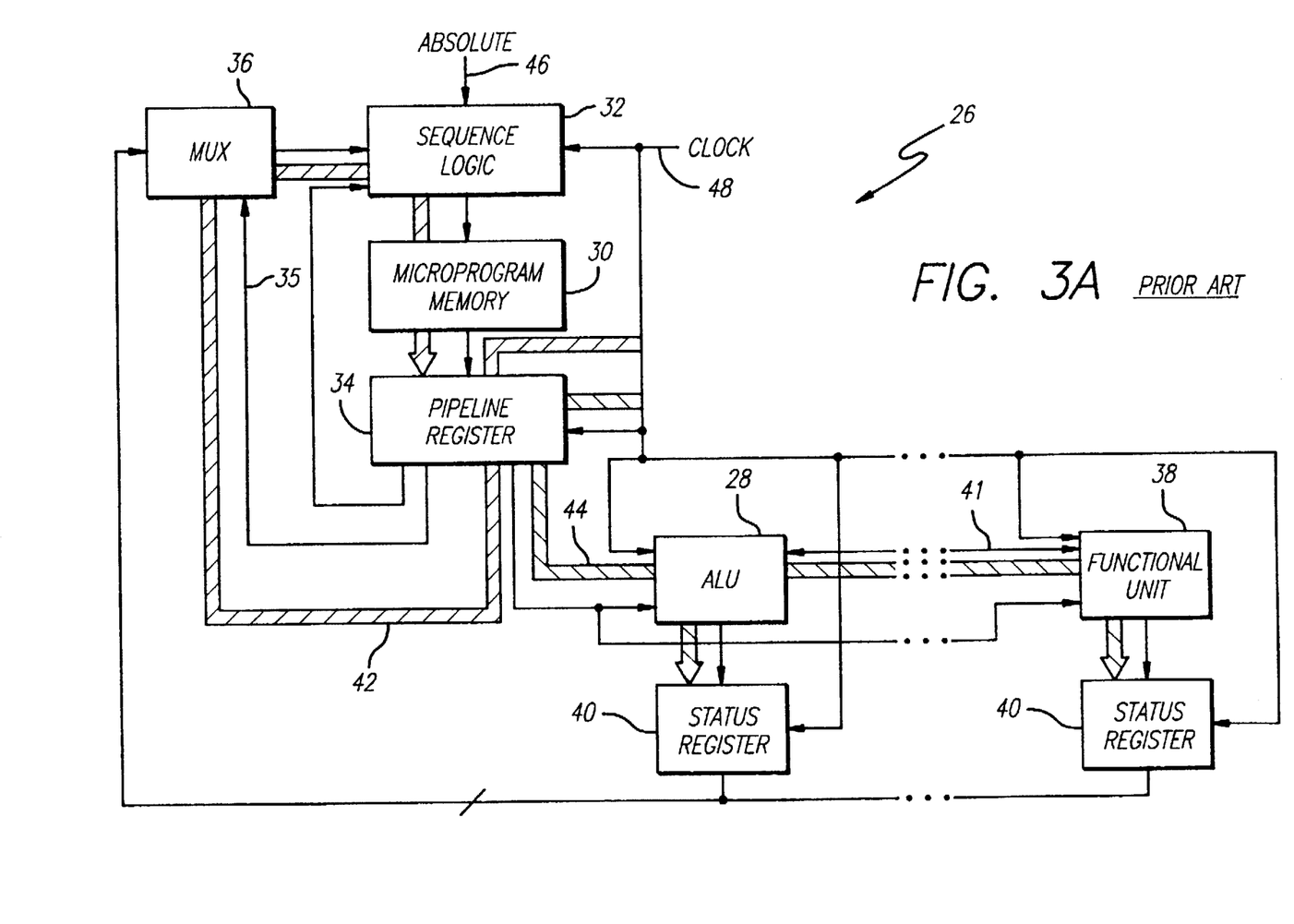
FIG. 3A is a generalized illustration of a fixed single stage pipeline control system in accordance with the prior art.
Figure 4:
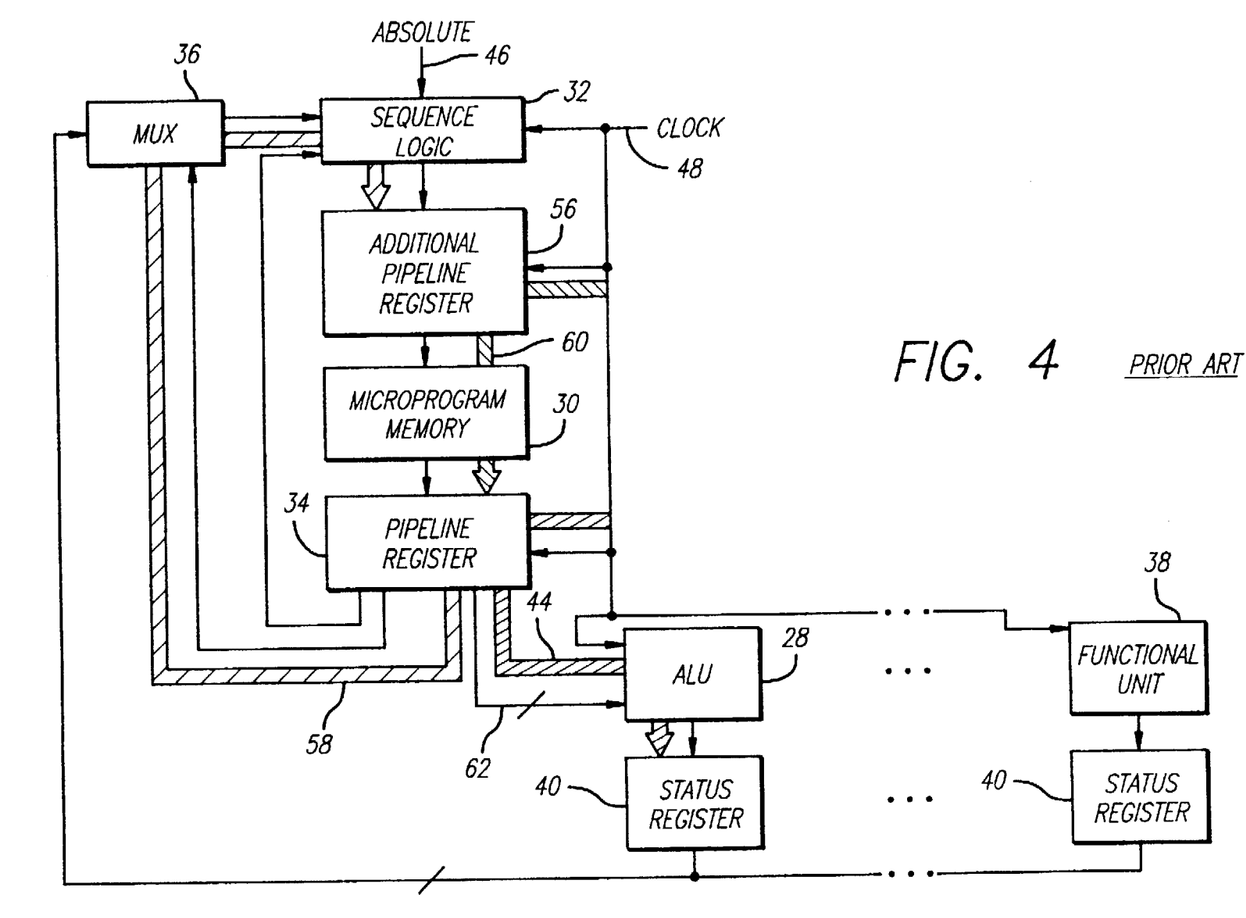
FIG. 4 is a generalized illustration of a fixed two-stage pipeline control system in accordance with the prior art.

FIG. 3A shows a fixed single stage pipeline control system 26. Arithmetic logic unit (ALU) 28 is shown as an example of one type of functional unit. Other functional units 38 can be provided in parallel with the ALU 28. The function of the fixed single stage pipeline control system 26 is to select a digital control microinstruction from the microprogram memory 30 to be sent to the pipeline register 34 on the occurrence of each clock pulse.

During a clock cycle, the functional units 38 decode the microinstruction and determine whether or not to perform some function based on the decoded information. A sequence of control microinstructions is generated in accordance with the pulses of the clock signal on clock line 48. The sequence of control microinstructions coordinates the activity of the functional units 38 in accordance with the changing needs of the target application.

Functional units 38 perform the various operations required to implement the target application. Each functional unit 38 may itself be a digital signal processor, or any other type of device which can be controlled using the microinstruction information. Many types of functional units 38 have their own set of instructions that can be executed within that functional unit. Additionally, each type of instruction may take from one to several clock cycles 48 to fully execute within a functional unit 38. For a given target application, the fastest functional units 38 will complete one instruction per clock cycle of clock 48. Thus, various numbers of clock cycles of clock 48 are required to complete the various tasks assigned to the various functional units 38 within the target application.

Additionally, the functional units 38 usually exchange data with each other on a data bus 41. The need to exchange data (or, intermediate results) among the functional units 38 means that some units may have to suspend their execution of a task until the required data becomes available from another functional unit. In other words, the tasks performed by the functional units 38 are not fully independent, thus requiring coordination by the pipeline control system 26.

Because nearly all target applications require such coordination, each functional unit 38 provides a status output to an respective status register 40, which is in turn output to a multiplexor 36. This allows the pipelined control system 26 to monitor a functional unit's 38 current state of operation, that is, its current status.

The microprogram memory 30 stores the various control microinstructions, the form and content of which are dependent on the details of the target application and on the particular functional units 38 used to implement the target application. A control microinstruction is generally divided into several fields of information, each field facilitating a different function within the digital processing system.

During any given clock cycle in a sequence of clock cycles, the pipeline register 34 contains a current microinstruction, and one or more functional units 38 may be operating in accordance with information contained in the current microinstruction. Status registers 40 each contain a current status derived during the execution of a previous microinstruction by a given functional unit 38.

Simultaneously, sequence logic 32 decodes information from one of the status registers 40 and one of the fields of the current microinstruction (contained in pipeline register 34) to select a next microinstruction, which will become the current microinstruction on the occurrence of the next clock pulse. Note that a field of information from the current microinstruction is input to multiplexor 36 over select line 35 in order to select the contents of a particular status register 40 to pass on to the sequence logic 32.

The sequence logic 32 uses information from one of the control microinstruction fields currently stored in the pipeline register 34 and uses current status information from one of the functional units (available at the output of multiplexor 36) to determine which control microinstruction should be next selected from microprogram memory 30 for execution on the next clock cycle. Thus, on each clock pulse a new control microinstruction is selected based on the current status of any one of the functional units 38 and on the information contained in one of the current control microinstruction fields. Notice that the next control microinstruction is selected only one clock cycle in advance of its execution.

Figure 3B:
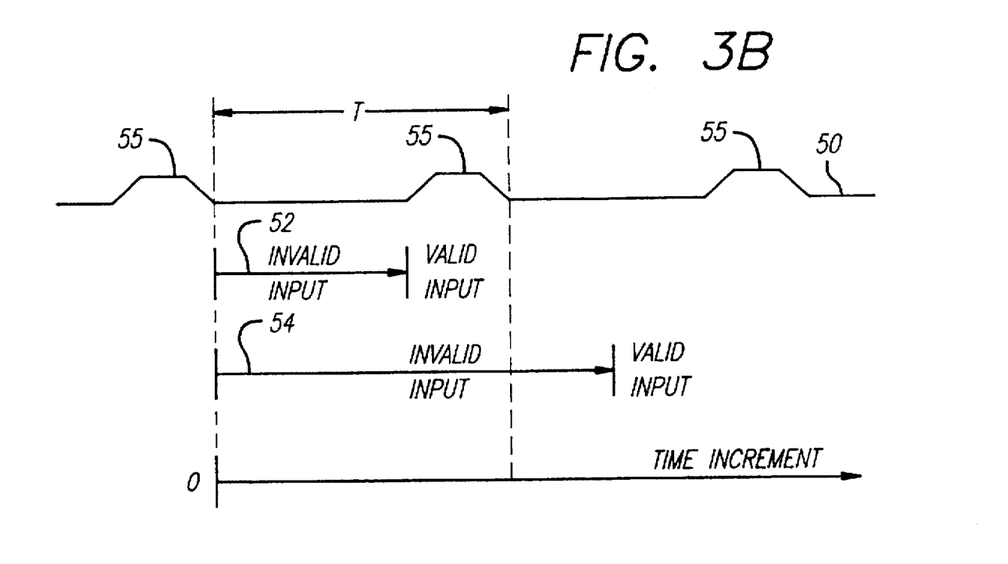
FIG. 3B is a generalized timing diagram illustrating the limits on clock speed based on the critical path in a generalized fixed stage pipeline control system.

Two critical paths 42, 44, are indicated by large arrows in FIG. 3A. The frequency of clock 48 is limited by the longest propagation delay in either of these paths. Referring to FIG. 3B, a generalized timing diagram shows that the clock period "T" must be greater than the longest propagation delay 52 or 54 in either critical path 42, 44, or the control sequencer 26 will not function properly. Clock 50 appears on the clock line 48 and comprises pulses 55 spaced at the clock period "T". As "T" is increased the frequency of the clock decreases and the pipelined control system executes fewer microinstructions in a given amount of time, operating more slowly.

On each clock pulse input information is "clocked in" to pipeline register 34 and status registers 40 from their inputs. The propagation delay in paths 42, 44, which terminate at the register inputs, can be generally indicated by arrows 52, 54. The diagram indicates that valid register inputs are captured only when the clock period "T" is greater than the propagation delay in any critical path as shown by short propagation delay 52.

A long propagation delay 54 results in invalid data corrupting the system, unless "T" is increased, slowing down the system. If the propagation delay in the critical path is shortened, "T" can likewise be decreased, which increases the number of instructions executed by the pipelined control system 26 in a given amount of time, making it faster.

FIG. 4 shows a way of increasing the processing speed of the control system, using a fixed two-stage pipeline to reduce the propagation delay in the critical path. An additional pipeline register 56 is added between the sequence logic 32 and the microprogram memory 30 to form a fixed two-stage pipeline control system. The clock frequency can be increased because the critical path has been shortened, as indicated by the three large arrows, 44, 58 and 60.

The critical path 42 of FIG. 3 has been reduced to two critical paths, 58 and 60, by the insertion of the additional pipeline register 56. Although the fixed two-stage pipeline control system of FIG. 4 is capable of operating faster than the fixed single-stage pipeline control system of FIG. 3, it is much more difficult to program and implement, especially with respect to complicated target applications.

As illustrated in FIG. 4, within a given sequence of clock cycles, the next control microinstruction has already been selected and loaded into the additional pipeline register 56 while the current microinstruction is being executed from within pipeline register 34. This means that the next control microinstruction must be selected two clock cycles in advance of its execution. That is, the microprogram scheme must adequately project the control microinstruction needs of the target application two clock cycles in advance, based on the current status and microinstruction information available.

Since the current microinstruction also must indicate which status register to monitor as the current status, while simultaneously executing an appropriate new instruction for functional units 38, the programming task becomes highly complicated in a fixed two-stage pipelined control system. The length of the control microinstruction may need to be increased in order to accommodate additional information, and the number of microinstructions stored in the microprogram memory 30, that is, the microcode size, may increase significantly.

Generally, the tasks of programming and designing a fixed two-stage pipeline control system for a given target application are considerably more difficult and time consuming than the same tasks with respect to a fixed single stage pipeline control system. Thus, faster systems are much more costly to build.

As indicated by the above discussion, makers of digital processing systems desire to provide faster systems capable of processing a greater number of program instructions in a given amount of time in order to more effectively implement complicated target applications. Fixed stage pipeline controllers have been used as one way to attempt to provide faster systems. However, problems of cost and complexity, in terms of both hardware architecture and software programming, emerge as makers have attempted to increase the speed of fixed stage pipeline controllers by adding additional pipeline stages.

To summarize, in a pipelined system as illustrated in FIGS. 3A and 3B, the speed of operation is limited by the instructions having the longest execution time in clock cycles. For example, if the longest instructions require 3 clock cycles to execute, even single clock cycle instructions require 3 clock cycles for execution due to the latency of the pipeline. This undesirably limits the speed of operation of the system.

SUMMARY OF THE INVENTION

A control system embodying the present invention operates in a pipelined mode for executing multiple clock cycle instructions and in an open loop mode for executing single clock cycle instructions. A plurality of electrical functional units are capable of executing single clock cycle instructions and multiple clock cycle instructions respectively that are individually addressed and applied thereto by a processor.

The functional units generate current operational statuses after each clock cycle. A status indicator applies new operational statuses of the functional units to the processor. A status memory stores previous operational statuses of the functional units.

A control unit controls the status indicator to apply the previous operational statuses to the processor as the new operational statuses after one of the single clock cycle instructions has been applied to the functional units. The control unit further controls the status indicator to apply the current operational statuses to the processor as the new operational statuses after one of the multiple clock cycle instructions has been applied to the functional units.

In this manner, the single cycle instructions do not go through the pipeline, and their propagation times are not limited by the pipeline latency.

A flexible single cycle/multi-stage programmable pipeline control system in accordance with the present invention provides a significant advance in the art of using pipeline control for the optimization of complex target applications.

One aspect of the present invention is that it can flexibly adapt to operate as either a single-stage or a multi-stage pipeline control system on any given clock cycle. This ability provides multiple advantages over traditional fixed-stage micro-programmed control systems, among which are the maintenance of a high system clock speed, near-optimum management of the latencies inherent in various functional units, reduced microcode size, simplification of the microinstruction parameters, flexibility of pipeline architecture based on program control, and straightforward hardware implementation of the single cycle/multi-stage pipeline control system with respect to a given target application.

Another significant aspect of the present invention is that it makes path-length driven micro-programming possible, as will become evident in the following description.

Multiple functional units must interact in a coordinated manner in order to implement a given target application. Coordination of the functional units is achieved by providing a current microinstruction composed of fields of information to each of the functional units on each cycle of the clock. This is accomplished by capturing the microinstruction in the microinstruction register. The current microinstruction is executed, that is, it is operated on by one or more of the functional units, during the current clock cycle.

The functional units each indicate a current status output to a result/status multiplexor. The result/status multiplexor selects one of these status indications, or selects a previous status indication stored in the result status register, as the current selected status to be passed to the next pc logic circuitry based on information contained in one of the current microinstruction fields contained in the microinstruction register.

A result/status register accepts as input the current selected status output from the result/status multiplexor and captures the status information holding it for one clock cycle. This information is fed back into the input of the result/status multiplexor so that it is available on the next clock pulse. Thus, the current selected status is made available as the previous selected status on the next clock cycle. This is a significant feature of the present invention.

The next pc logic circuitry accepts a current selected status input from the output of result/status multiplexor, accepts information from a minimum of one field of the microinstruction currently stored in the micro-instruction register, and in alternative embodiments, accepts additional information from two external input sources labelled dispatch data and bus data. The next pc logic circuitry decodes this information to generate a "next pc" signal which is sent to microprogram memory storage.

Microprogram memory storage uses the "next pc" signal to select the next microinstruction from memory which is to be executed, that is, captured by the microinstruction register on the occurrence of the next clock pulse. This sequence of executing microinstructions is repeated in accordance with the occurrence of clock signals thus providing flexible control over the functioning of the target application.

The present invention makes use of several fields in the microinstruction in order to control the functional units and thus implement the target application. The various fields in a microinstruction can be customized based on the target application, so that the existence, function, and bit-length of the fields will vary from application to application. Generally, a control field "C" in each microinstruction is necessary to assign tasks to the various functional units. Also, an opcode field "O" in each microinstruction is required to enable next pc logic circuitry to properly select a next microinstruction to execute. The existence of other fields in the microinstruction is specific to the target application, and therefore not necessary to the operation of the present invention.

In one preferred embodiment of the present invention, next pc logic decodes both an opcode field from the current microinstruction and a current selected status signal in order to select the next microinstruction to execute. A previous selected status stored in result/status register may of course be chosen as the current selected status.

In an alternative preferred embodiment, additional fields may be included in the current microinstruction which are also decoded by the next pc logic circuitry, in addition to an opcode field and a current selected status, to select a next microinstruction to execute.

In further alternative preferred embodiments, a plurality of result/status registers may be used to provide a plurality of previous selected status indicators in either of the above preferred embodiments.

The use of result/status register to capture previous selected status information allows the present invention to flexibly adapt as either a single cycle or multi-stage pipeline control system on a given clock cycle, which facilitates the aforementioned advantages over the prior art.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 5:
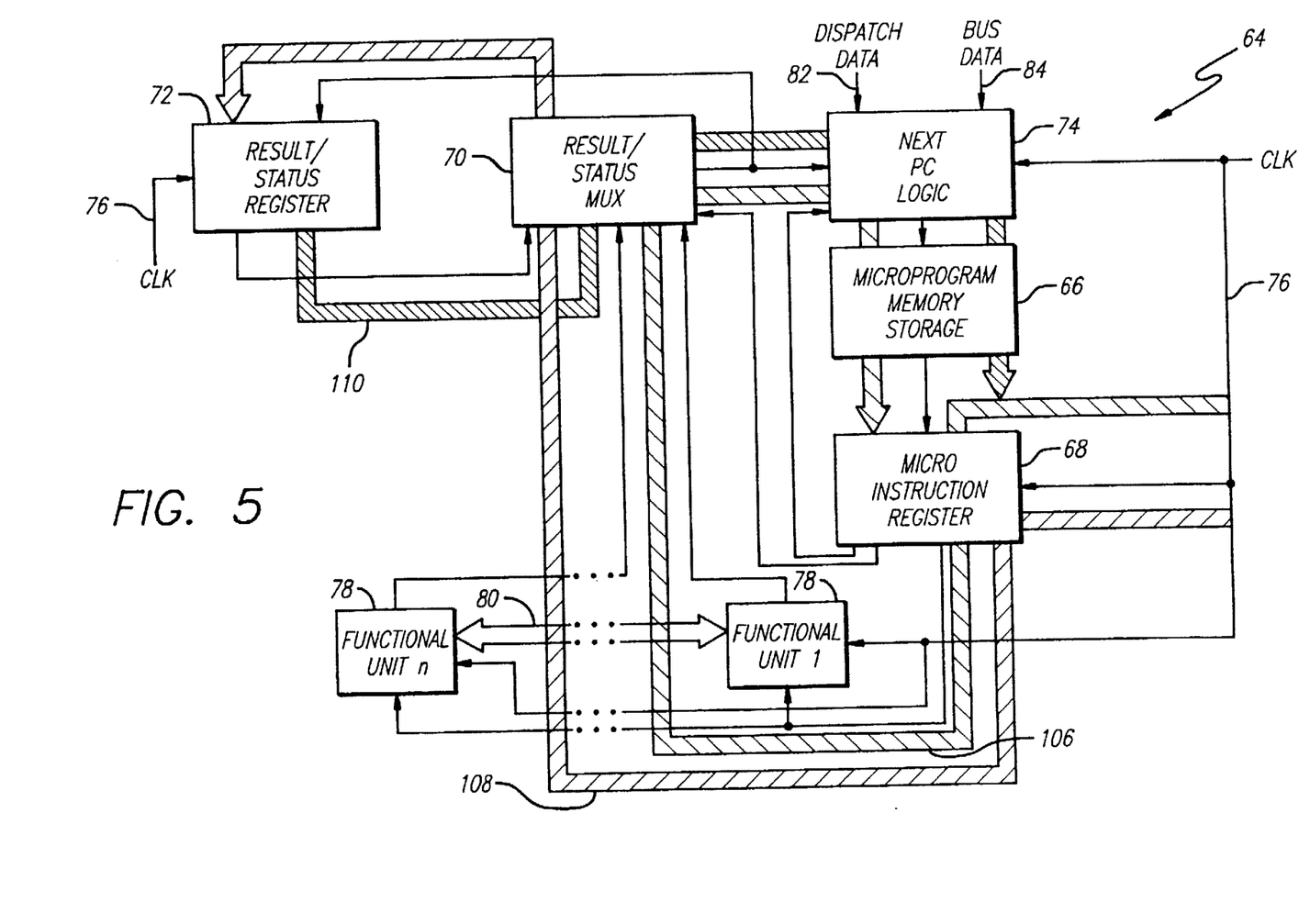
FIG. 5 is a block diagram illustration of a flexible single cycle/multi-stage pipeline control system in accordance with the present invention.

Referring to FIG. 5, a flexible single-cycle/pipelined or single-cycle/multi-stage programmable pipeline control system 64 in accordance with a preferred embodiment of the present invention comprises a microprogram memory storage 66, a microinstruction register 68, a status indicator or result/status multiplexor 70, a status memory or result/status register 72, a processor or next pc logic circuitry 74 and a system clock line 76.

Microprogram memory storage 66 stores an operating program including digital microinstructions used by the system 64 to control functional units 78 in order to implement the target application. Microprogram memory storage 66 can be implemented as random access memory, read only memory, or any other suitable digital storage device. Microprogram memory storage 66 accepts an input signal labelled "next pc" (next program counter instruction) from the next pc logic circuitry 74 and provides an output signal to the microinstruction register 68.

Internal logic in the microprogram memory storage 66 decodes the information contained in the "next pc" signal in order to select the information stored in one of its memory locations to be output to the microinstruction register. This decoding is done in a conventional manner.

Microinstruction register 68 captures and stores the current microinstruction information presented by microprogram memory storage 66 on the occurrence of each clock pulse of the system clock 76, in a conventional manner. The digital information within the microinstruction is arranged into subsets known as fields. The microinstruction fields will be described in detail below. The microinstruction register 68 outputs information from the various fields to the functional units 78, result/status multiplexor 70, and to next pc logic circuitry 74, on each clock cycle.

Functional units 78 perform the various functions required to implement the target application. Each unit may itself be a digital signal processor, or any other type of device which can be controlled using the microinstruction information. Typical examples from a picture reconstruction target application include motion compensation circuitry, an Inverse Discrete Cosine Transform (IDCT) pipeline, and a Dynamic Ram Controller.

The functional units 78 respond to different sets of instructions that can be executed internally. Additionally, each type of instruction may take from one to several clock cycles to execute or complete. For a given target application, the fastest functional units 78 will complete one instruction per clock cycle. Thus, various numbers of clock cycles are required to complete the various tasks assigned to the various functional units 78 within the target application. Additionally, the functional units 78 exchange data with each other on a data bus 80. The need to exchange data (or, intermediate results) among the functional units 78 means that some units 78 may have to suspend their execution of a task until the required data becomes available from another functional unit 78.

This is necessary because the tasks performed by the functional units 78 are not fully independent, thus requiring coordination by the control system 64. Because nearly all target applications require such coordination, each functional unit 78 provides a current status output to the result/status multiplexor 70, so that the control system 64 can monitor a functional unit's 78 current state of operation.

The result/status multiplexor 70 uses information from one of the current microinstruction fields to select a current operational status from one of the functional units 78 or to select a previous operational status stored in result/status register 72, to be passed as output to both the next pc logic circuitry 74 and to the result/status register 72 as a new operational status. The new status information is captured in the result/status register 72 on the next clock pulse from clock 76.

The ability to capture a previous status on a previous clock pulse to be available as a new status on a current clock cycle is a significant feature of the present invention, and facilitates many advantages of the present invention over the prior art, as will become more fully evident from the discussion.

The system 64 operates as a pipeline for multiple clock cycle instructions and in open loop mode for single clock cycle instructions. Single cycle instructions do not go through the pipeline, and their propagation times are not limited by the pipeline latency.

More specifically, if the register 72 were not provided, all instructions would go through the pipeline, and would be executed in periods of time corresponding to the instruction requiring the largest number of clock cycles to execute. For example, if the longest execution time instruction required three cycles to execute, this constitutes the latency of the pipeline, and all instructions, including single clock cycle instructions, would require three clock cycles to execute.

The register 72, however, enables the operational status for single clock cycle instructions to be captured and made immediately available, thereby bypassing the pipeline. In this manner, single clock cycle instructions can be executed in one clock cycle, thereby substantially increasing the speed of operation of the control system 64.

In alternative preferred embodiments, multiple result/status registers 72, along with associated control circuitry, could be used to capture status information from multiple previous clock cycles.

Next pc logic circuitry 74 accepts inputs from the result/status multiplexor 70, from several fields of the current microinstruction contained in the microinstruction register 68, and from two external data sources labelled dispatch data 82 and bus data 84. Next pc logic circuitry 74 decodes the information from these various inputs in order to generate a "next pc" signal to the microprogram memory storage 66 which allows it to select the next microinstruction to be sent to the microinstruction register 68, as described above.

This facilitates the program flow of the digital processing system. Details of the next pc logic circuitry 74 will be presented below in conjunction with a more detailed discussion of the operation of the control system 64.

Figure 6:
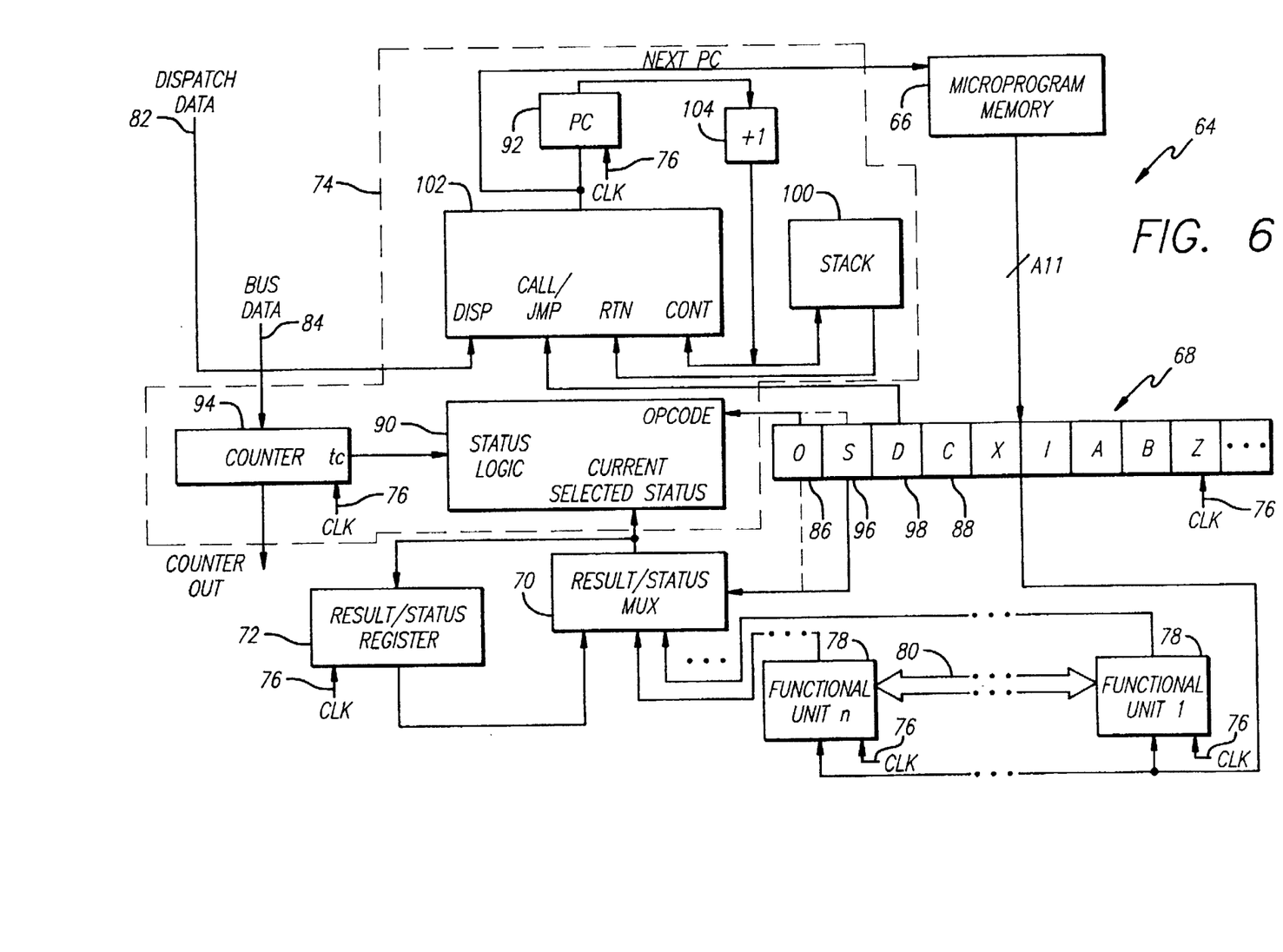
FIG. 6 is a more detailed illustration of FIG. 5, showing details of the microinstruction fields and next pc logic unit in accordance with the present invention.

Referring to FIG. 6, the microinstruction register 68 is shown as containing fields "O", "S", "D", "C", etc. Also, details of the next pc logic circuitry 74 are shown. Next pc logic circuitry 74 contains a program counter register 92 which points to or selects, in a conventional manner, the address of a next microinstruction from microprogram memory storage 66. The program counter register 92 may or may not be a clocked register, in alternative preferred embodiments.

If program counter register 92 is clocked, as shown in FIG. 6, then an additional stage of pipelining is built into the system. The contents of program counter register 92 essentially determine the program flow of the control system 64, and thus implement the target application by controlling the functional units 78.

Next pc logic circuitry 94 facilitates the implementation of absolute address calls, branches, jumps, returns, and loops to subroutines contained in microprogram memory storage 66, thus executing the program in accordance with the dictates of the target application.

As can be seen in FIG. 6, status indications and microinstruction fields are fed back into the next pc logic circuitry 74 so that it can decode this information and generate a new value for program counter register 92 on the next clock cycle. Also, dispatch data input 82 may be used to load an absolute address into the program counter register 92, so that an unconditional program sequence (subroutine) may be instituted, as may be necessary for example during reset or start-up of the system. Bus data 84 allows the loop counter 94 to be loaded with data from the data path when necessary.

Operation of the control system 64, in accordance with one preferred embodiment, will be described with reference to a current clock cycle within a sequence of clock cycles during program execution. A current microinstruction is loaded into the microinstruction register 68 on the current clock cycle. In a preferred embodiment, only an opcode "O" field 86 and a control "C" field 88 are required for the operation of system 64. An additional status "S" field 96 may also be included in an alternative preferred embodiment.

Status field 96 is input to result/status multiplexor 70, which decodes the information in a conventional manner in order to select a current selected status for output to the status logic 90. A previous selected status, stored in result/status register 70, can of course be selected. The availability of a previous selected status greatly simplifies program design and also avoids critical path problems during certain portions of program execution. The current selected status is input to the status logic 90 at an input labelled "current selected status".

Control field 88 is sent to each of the functional units 78 on each current clock cycle. The functional units 78 decode control field 88 which tells them which types of tasks or operations to carry out. Some functional units 78 are capable of carrying out a specific assigned task in just one clock cycle. In such cases, there is no need for the next pc logic circuitry 74 to poll the current status indication for that functional unit 78 on the next clock cycle.

This feature, in conjunction with the availability of a previous selected status in the result/status register 72 facilitates much more efficient microcoding (programming) which also utilizes the functional units 78 in a more efficient manner. The various latencies of the functional units 78 can be optimized as will become more evident below.

Other tasks require multiple clock cycles for functional units 78 to complete, and may also require that different functional units 78 share partial results with each other across data bus 80. Such multiple cycle instructions generally require the use of status indications in order to properly time and coordinate the activities of the various functional units 78. Examples of such status indications are "busy", "waiting", or "finished". However, such indications are highly dependent on the tasks being performed and therefore are highly dependent on the dictates of the underlying target application.

General program control by the program counter register 92 is as follows, with greater detail being provided in the example below. Status logic 90 accepts the current selected status, and opcode field 86 contained in the current microinstruction, and decodes these signals, providing a select signal to next pc multiplexor 102. Opcode field 86 and current selected status are decoded to determine what operation the program counter register 92 will perform next.

Additionally, in an alternative preferred embodiment, a terminal count signal from the loop counter 94 may also be decoded by status logic 90. Decoding is done in a conventional manner to generate a select signal which is output to next pc multiplexor 102. The decoding scheme and arrangement of field information, however, is tailored to the target application requirements.

Next, pc multiplexor 102 accepts a select signal from status logic 90 as just described, in order to select from among the following four inputs one signal to be output to program counter register 92. Dispatch data input 82 is used to allow an absolute address value to be loaded directly into the program counter register 92 through next pc multiplexor 102, utilizing an external data path.

Direct data input field 98, contained in the current microinstruction, is used to load a call or jump address into the program counter register 92 to enable branching or nesting of subroutines.

A stack 100 is included in next pc logic circuitry 74 to store return and continue addresses during call or jump executions, respectively. A return address can be selected to be loaded into the program counter register 92 through the input to next pc multiplexor labelled "RTN".

The contents of the program counter register 92 can be incremented by one using incrementer 104. The incremented program counter value can then be either input to the program counter register 92 through next pc multiplexor 102, or input to the stack for later use as a continue address available at the "CONT" input of next pc multiplexor 104.

Status logic 90 decodes the information from opcode field "O", the current selected status, status field "S", and the terminal count output from the loop counter, in order to select a source of information to be loaded into the program counter register 92 on the next clock cycle. In this way, the next microinstruction to be executed is selected from microprogram memory 66 based on functional unit 78 status information and on information in the current microinstruction. Note that for some underlying target applications, not all of the above features would be necessary to the functioning of the present invention.

The present invention makes use of the above features to maintain a high system clock speed (frequency) while also allowing for ease of programming and reduced cost design, in the following manner. Single cycle execution of a control field 88 by a functional unit 78 means that the output status of that unit need not be considered on the next clock cycle, since the status is known in advance. Other functional units 78 may have various output status indications available, however, based on the current state of the control system 64.

Whenever a single cycle microinstruction is executed, the result/status register 72 can be utilized to capture a current selected status indication from one of the other functional units 78, storing it as a previous selected status available on the next clock cycle. On the very next clock cycle, the previous selected status may be selected as the new selected status, and may be used to generate a next microinstruction to execute. In this way, the system 64 can "schedule" the activities of the various functional units 78 so that an optimum number are operating at any given time.

For instance, if a functional unit 78 is instructed by the current microinstruction control field 88 to operate on a task known to (1) require multiple clock cycles to complete; (2) require possible exchange of data from other functional units 78 and therefore waiting; or (3) have a particular latency associated with the functional unit 78; then the system 64 can execute single cycle microinstructions to fill in the gaps.

Since previous selected status information is available on every clock cycle, however, the present invention can monitor functional units 78 operating under conditions (1), (2) or (3) above regarding critical changes in status. It can then reassign long duration tasks to such functional units 78, and go back to executing single cycle microinstructions to fill in the gaps. The use of result/status register 72 in accordance with the teaching of the present invention ensures that critical status information is available and allows many functional units 78 to be operating simultaneously to coordinate their activities efficiently.

Path-length driven programming is also achieved by the present invention in the following way. Referring to FIG. 5, it can be seen that the result/status register 72 can be used to reduce a critical path 106 through any of the functional units 78 to two critical paths 108 and 110, broken up by the register 72. The clock frequency of the system 64 is set as high as the critical path 106 propagation delay will allow for the longest delayed path in a single cycle functional unit 78.

For functional units 78 which have a longer propagation delay, two or more clock cycles can be utilized without losing critical status information, since valid information can be captured eventually by the result/status register 72. The data will be valid as long as the system 64 does not attempt to select such a status at a time shorter than the propagation delay in critical path 108 for that particular functional unit 78.

Since all critical path delays can be known in advance, the microprogram is designed to wait the appropriate amount of clock cycles before attempting to capture status information from any critical path having a propagation delay greater than a single clock cycle. In the meantime, single cycle instructions can be executed in the "fast" functional units 78, having critical path 106, without any loss of data.

Thus, the present invention also makes path-length driven microprogram control possible, making much more efficient use of the propagation delays in critical paths of the various functional units 78.

In another form of preferred embodiment, the present invention may use a scoreboard memory within the status logic 90 to track the multiple parallel operations that the system 64 is executing. The scoreboard monitors task scheduling and status indications as the system operates, and also aids in scheduling tasks. As the system operates, the scoreboard accumulates statistical data regarding its performance, and can be used to further optimize scheduling. The scoreboard can be implemented as a conventional register file in either firmware or dedicated hardware, and may either constantly monitor the system or may only do so periodically or during testing.

EXAMPLE

An example of a single cycle/multi-stage control system 64, in accordance with the present invention, is explained with reference to FIGS. 5, 6, 7, 8, and 9. In this example, the system 64 is used to control the functional units in a Motion Picture Experts Group (MPEG) decoder target application. The instant MPEG decoder is a video picture reconstruction device built in accordance with, for example, MPEG international video standard DIS 11172.

Figure 7:
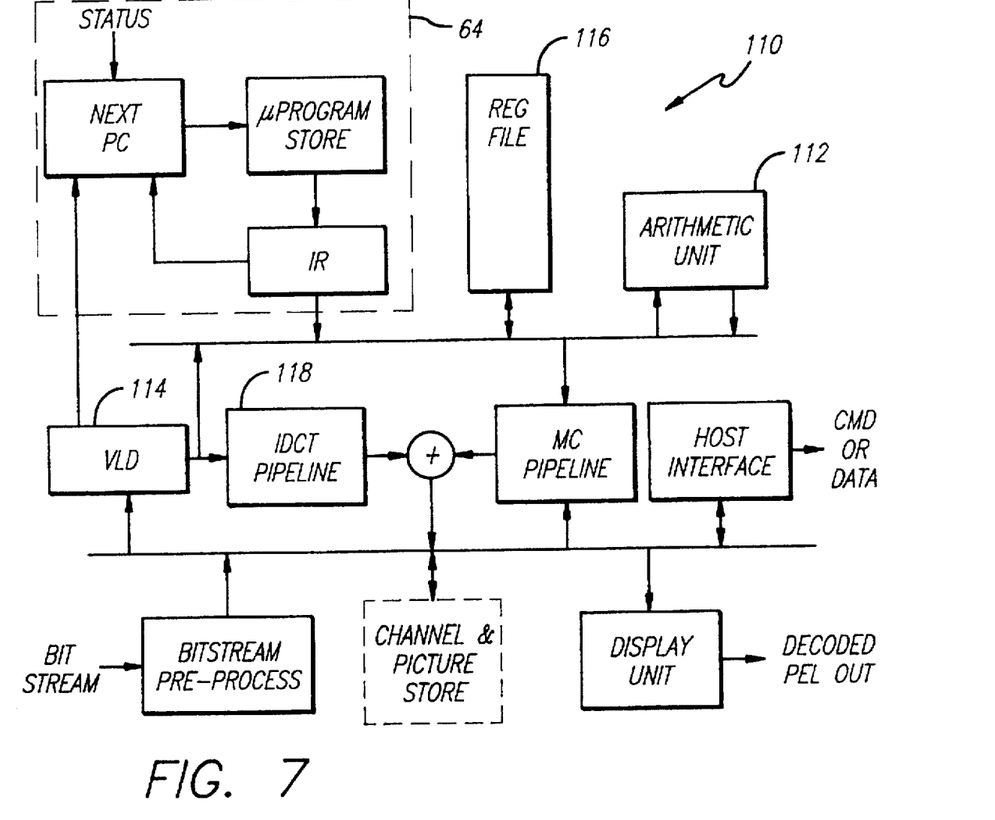
FIG. 7 shows a block diagram of a video picture reconstruction system built and operated under the control of the present single cycle/multi-stage pipeline control system in accordance with the disclosed example.

FIG. 7 shows a block level diagram of the MPEG decoder 110 in accordance with the present example. Table 1 indicates the functional units which are included in the MPEG decoder 110. Microcontroller unit "U" includes the control system 64 in accordance with the present invention. FIG. 7 depicts the data flow scheme of the decoder 110. The control scheme for the decoder 110 is shown in FIGS. 5 and 6. Each functional unit 78 listed in table 1, other than the microcontrol unit "U", is connected to the system 64 as shown in FIGS. 5 and 6.

Exact details of the various functional units 78 listed in table 1 are beyond the scope of this disclosure, and are not necessary to enable one skilled in the art to make and use the present invention. Therefore, only relevant characteristics of the various functional units 78 are discussed.

Figure 8:
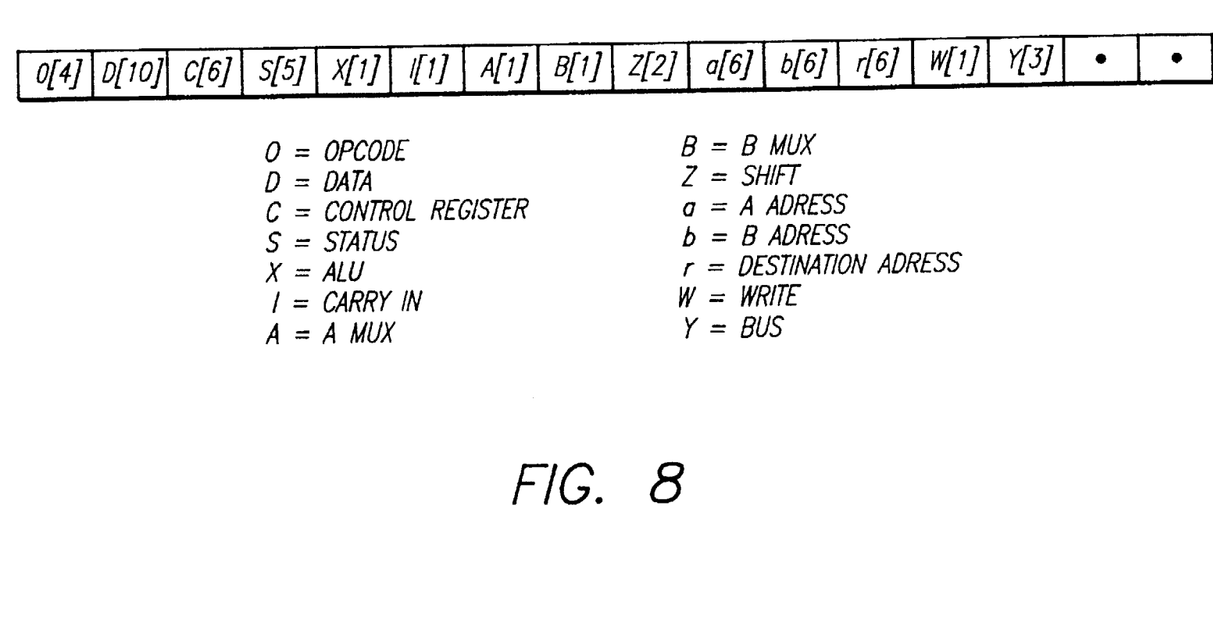
FIG. 8 shows a microinstruction format used in the construction of the single cycle/multistage control system in accordance with FIG. 7 and the disclosed example.

FIG. 8 shows the microinstruction format utilized in the construction of the MPEG decoder 110. Each field is indicated in a box along with the number of bits used in its implementation. Still referring to FIGS. 5, 6, and 7, the fields have the following functions.

Opcode "O" is 4 bits in length and is used to instruct the status logic 90 which input source to select as output from the next pc multiplexor 102 into program counter register 92. Opcodes will be discussed in detail with reference to FIG. 9 below.

Data "D" is 10 bits in length, and is used to drive the call/jump input of the next pc multiplexor 102 so that the program counter register 92 can be directly loaded with this data when an appropriate Opcode "O" is present. The least significant five bits of Data "D" are also used to drive the variable length decoder 114 number of integer bits input, saving microinstruction bits by trading the capability to branch or load direct data. Whenever the least significant five bits of Data "D" is zero, the least significant five bits of register field "b" are used instead as the number of integer bits input to the VLD. This is done to handle context dependent integer size cases that the microprogram cannot determine until decode time.

Control "C" is 6 bits in length and is used to send operating instructions to the functional units 78. Each functional unit listed in Table 1 decodes the Control field "C" and executes a task when appropriate.

Status field "S" is 5 bits in length and is used by status logic 90 to test various conditions within the MPEG decoder 110 so that the program counter register 92 is loaded with a different value based on the alternative states of information within the system. This will be discussed below.

The "X", "T", "A", "B", and "Z" fields all give direct instruction information to the Arithmetic Logic Unit (ALU) 112. Note that the ALU 112 defines the longest propagation delay critical path for the MPEG decoder 110, based on a single cycle instruction. That is, the propagation delay through a control path 106 as shown in FIG. 5, which includes the ALU 112 as the relevant functional unit 78, is approximately 36 nanoseconds in duration. This limits the clock frequency of the control system 64 to approximately 27 MHz.

The "a", "b", "r", and "W" fields all provide instruction information regarding read and write operations to the register file 116. The "Y" field is used to signal which functional unit 78 has control over data bus 80 at a given time.

The microprogram or microcode stored in microprogram memory 66 thus contains microinstructions enabling the various functional units 78 to carry out various tasks required by the MPEG decoder 110. The control system 64 (microcontroller "U") executes the various microinstructions in sequence in conjunction with the system clock 76 according to the following scheme.

Figure 9:
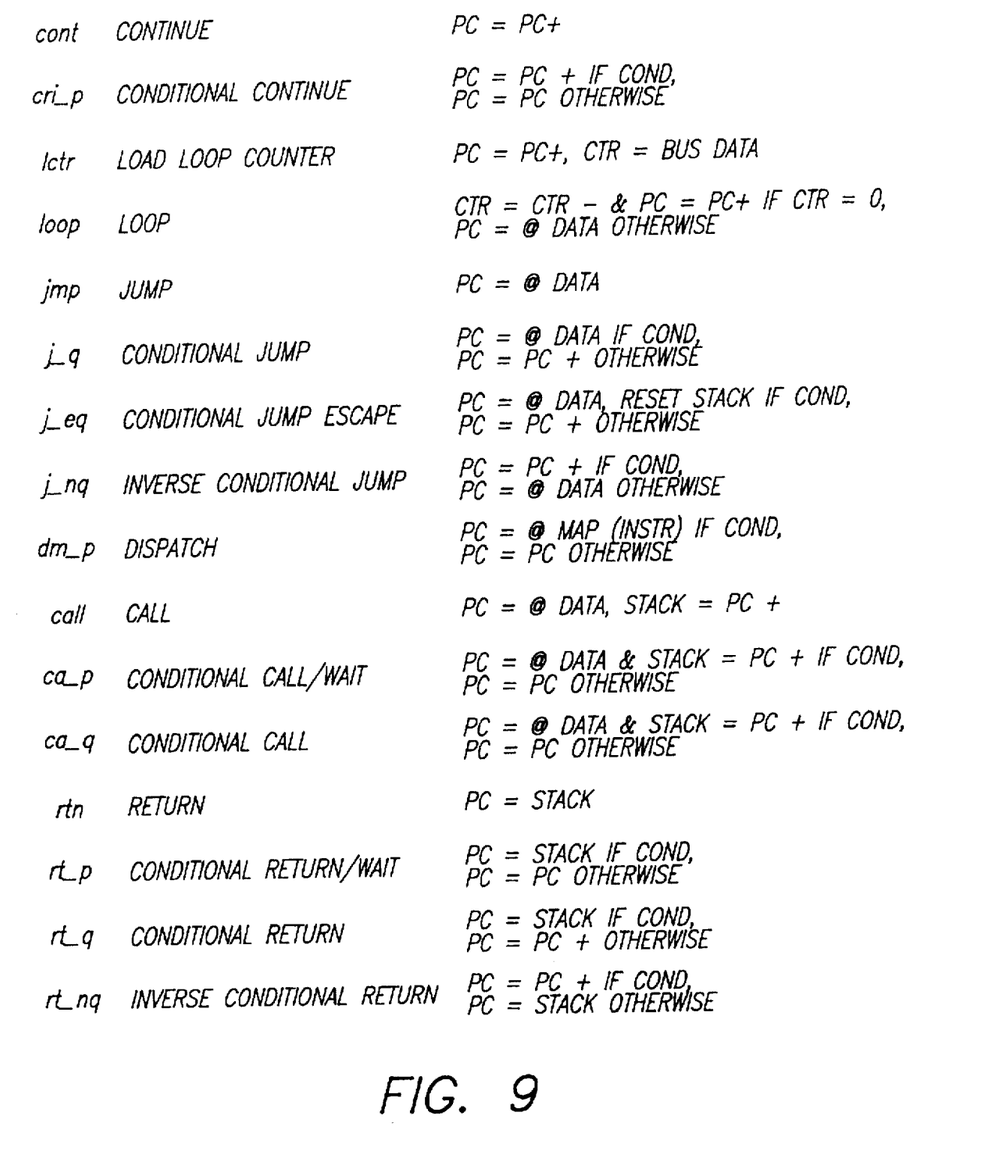
FIG. 9 shows a table of microinstruction opcodes used in the operation of the single cycle/multistage control system in accordance with FIG. 7 and the disclosed example.

Referring to FIG. 9, a table of microinstruction opcode definitions includes descriptions of sixteen opcodes used in the MPEG decoder 110 application. The opcodes coordinate the microprogram sequence generally as follows.

The continue "cont" opcode simply instructs the status logic 90 to increment the program counter register 92. This means that the very next microinstruction stored in microprogram memory 66 is executed on the next clock cycle.

The conditional continue "cn_p" opcode instructs the status logic 90 to increment the program counter register 92 only if a condition in the status field "S" is true, otherwise the contents of the program counter register 92 remain the same.

The load loop counter "lctr" opcode instructs the status logic 90 to increment the program counter and to load the loop counter 94 with the data appearing on data bus 84. The loop "loop" opcode instructs the status logic 90 to decrement the loop counter 94 and increment the program counter register 92 if the loop counter value is zero (terminal count value=1), otherwise the program counter register is loaded with the data appearing in the Data field "D" of the current microinstruction.

The jump instruction "jmp" opcode instructs the status logic 90 to load the program counter register 92 with the data appearing in the Data field "D" of the current microinstruction.

The conditional jump "j_q" opcode instructs the status logic 90 to load the program counter register 92 with the data appearing in the Data field "D" of the current microinstruction if a condition in the status field "S" is true, otherwise the status logic 90 is instructed to increment the program counter register 92.

The conditional jump escape "j_eq" opcode instructs the status logic 90 to load the program counter register with the data appearing in the Data field "D" of the current microinstruction and to reset the stack if a condition in the status field "S" is true. Otherwise, the status logic 90 is instructed to increment the program counter register 92.

The inverse conditional jump "j_nq" opcode instructs the status logic 90 to increment the program counter register 92 if a condition in the status field "S" is true. Otherwise, the status logic 90 is instructed to load the program counter register 92 with the data appearing in the data field "D" of the current micro instruction.

The dispatch instruction "dm_p" opcode instructs the status logic 90 to load the program counter register 92 with the data appearing on the dispatch data line 82 if a condition in the status field "S" is true. Otherwise, the contents of the program counter register 92 remain the same.

The call instruction "call" opcode instructs the status logic 90 to load the program counter register 92 with the data appearing in the data field "D" of the current micro instruction and push the incremented value of the program counter register 92 onto the stack if a condition in the status field "S" is true. Otherwise, increment the program counter register value.

The conditional call/wait "ca_p" opcode instructs the status logic 90 to load the program counter register 92 with the data appearing in the data field "D" of the current micro instruction and push the incremented value of the program counter register onto the stack if a condition in the status field "S" is true. Otherwise, the contents of the program counter register 92 remain the same.

The conditional call "ca_q" opcode instructs the status logic 90 to load the program counter register 92 with the data appearing in the data field "D" of the current microinstruction and to push the incremented program counter register 92 value onto the stack if a condition in status field "S" is true. Otherwise, the contents of the program counter register are incremented.

The return instruction "rtn" opcode instructs the status logic 90 to pop the contents of the stack 100 into the program counter register 92.

The conditional return/wait "rt_p" opcode instructs the status logic 90 to pop the contents of the stack 100 into the program counter register 92 if a condition in the status field "S" is true. Otherwise, the contents of the program counter register 92 remain the same.

The conditional return "rt_q" opcode instructs the status logic 90 to pop the contents of the stack 100 into the program counter register 92 if a condition in the status field "S" was true. Otherwise, increment the value stored in the program counter register 92.

The inverse conditional return "rt_nq" opcode instructs the status logic 90 to increment the value stored in the program counter register 92 if a condition in status field "S" of the current micro instruction was true. Otherwise, pop the contents of the stack 100 into the program counter register 92.

The above described opcode functions allow the control system 64 to fully control the operation of the various functional units 78 of the MPEG decoder 110 application. The control system 64 is able to achieve the advantages of maintaining a high system clock frequency, near-optimum management of the latencies inherent in various functional units, reduced microcode size, simplification of the micro-instruction parameters, flexibility of pipeline architecture based on program control, and straightforward hardware implementation of the single cycle/multi-stage pipeline control system with respect to MPEG decoder 110 target application.

For example, the inverse discrete cosine transform (IDCT) pipeline module 118 was known to have the greatest latency of any functional unit 78 since it contains the pipeline having the most stages. The use of the various functional units 78 was effectively optimized by properly managing the latencies and throughputs of the various functional units 78.

One way to do this is to assign the IDCT pipeline module 118 processing tasks as early as possible in the decode process, so that its latency will enable the microcontroller unit 64 to manage other functional units 78 while waiting for the first status outputs from the IDCT pipeline 118. Also, the system 64 was able to later maintain the throughput in the IDCT pipeline 118, using its current status indications, so that a relatively constant stream of data flows in the IDCT pipeline 118. This minimizes the processing delays caused by the IDCT pipeline's 118 long latency.

The ALU 112 is used heavily in the MPEG decoder 110 application. For the most part it executes tasks in a single clock cycle. The single control system 64 is thus able to start several of the functional units 78 operating on multiple clock cycle tasks, and then intersperse single cycle tasks in the ALU into the program sequence, so that it too is operating on the same clock cycle as the other active functional units 78.

Furthermore, the status output of any functional unit 78 operating on a multiple clock cycle task can be selected on the current clock cycle of any single cycle microinstruction. This allows the control system 64 to easily project in advance the next needed microinstruction, while maintaining a high clock speed (frequency), and keeping the overall throughput of the MPEG decoder 110 high.

The present control system 64 is also able to flexibly handle, under program control, differences in path-delay among the various functional units 78. The path delay can be adequately handled by capturing the status indication output of a functional unit 78 in the result/status register 72 at an appropriate number of clock cycles after a given task is assigned to the particular functional unit 78. In this way, the system 64 is able to accommodate differences in functional unit 78 path-lengths due to either latency in a pipeline or propagation delay through a critical path. Essentially, the control system 64 makes path-length driven microprogramming possible within the context of the MPEG decoder 110 application.

The generalized embodiments of the single cycle/multi-stage pipeline control system 64 disclosed in the description of the preferred embodiment above can similarly be used to produce the aforementioned advantages in the context of any complex target application.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A control system for controlling a plurality of electrical functional units having the ability to execute single clock cycle instructions and multiple clock cycle instructions that are individually addressed thereto, and generate current operational statuses after each clock cycle, comprising:
   a processor for selectively generating and applying said single clock cycle instructions and said multiple clock cycle instructions to said plurality of electrical functional units;
   a status indicator for applying new operational statuses of said plurality of electrical functional units to the processor;
   a status memory for storing previous operational statuses of said plurality of electrical functional units; and
   an evaluation/control unit for:
      evaluating whether a single clock cycle instruction or a multiple clock cycle instruction has been applied to said plurality of electrical functional units;
      applying said previous operational statuses to the processor as said new operational statuses after one of said single clock cycle instructions has been applied to said plurality of electrical functional units; and
      applying said current operational statuses to the processor as said new operational statuses after one of said multiple clock cycle instructions has been applied to said plurality of electrical functional units.

2. A control system as in claim 1, in which:
   the status indicator comprises a multiplexor that receives said previous statuses from the status memory and said current statuses from said functional units; and
   the processor controls the multiplexor to select and apply said previous statuses or said current statuses thereto as said new statuses.

3. A control system as in claim 1, in which the processor stores an operating program including said single clock cycle instructions and said multiple clock cycle instructions, and selects one of said functional units to be addressed and one of said single clock cycle instructions or one of said multiple clock cycle instructions to be applied to said plurality of electrical functional units in accordance with said operating program and said new operational statuses.

4. A control system as in claim 3, in which:
   the status indicator comprises a multiplexor that receives said previous statuses from the status memory and said current statuses from said plurality of electrical functional units; and
   the processor controls the multiplexor to select and apply said previous statuses or said current statuses thereto.

5. A control system as in claim 1, in which the status memory comprises a register.

6. A control system as in claim 1, in which the processor determines whether an instruction being applied to the functional units is a single clock cycle instruction or a multiple clock cycle instruction, and controls the status indicator to select said previous operational statuses or said current operational statuses respectively in response thereto.

7. A control system as in claim 1, in which:

said multiple clock cycle operations require different numbers of clock cycles to execute; and the processor further selects one of said single clock cycle instructions to be applied to said plurality of electrical functional units when one of said multiple clock cycle instructions has been previously applied to the plurality of electrical functional units and a predetermined number of clock cycles has not elapsed since application of said multiple clock cycle instructions.

8. A control system as in claim 1, in which:

said multiple clock cycle instructions require different numbers of clock cycles to execute; and the processor comprises a scoreboard memory for storing said numbers of clock cycles corresponding to said multiple clock cycle instructions respectively, and selects one of said single clock cycle instructions to be applied to said plurality of electrical functional units when one of said multiple clock cycle instructions has been previously applied to the plurality of electrical functional units and said number of clock cycles stored in the scoreboard memory corresponding thereto has not elapsed.

9. A method of controlling a plurality of electrical functional units that are capable of executing single clock cycle instructions and multiple clock cycle instructions that are individually addressed thereto, and generating current operational statuses after each clock cycle, comprising the steps of:

(a) storing previous operational statuses of said functional units;

(b) selectively generating and applying said single clock cycle instructions and said multiple clock cycle instructions to said functional units, said selectively generating an applying step comprising the substeps of:

(c) selecting said previous operational statuses as new operational statuses after one of said single clock cycle instructions has been applied to said functional units; and (d) selecting said current operational statuses as new operational statuses after one of said multiple clock cycle instructions has been applied to said functional units;

(e) storing said numbers of clock cycles corresponding to said multiple clock cycle instructions respectively;

(f) counting clock cycles after said one of said multiple clock cycle instructions has been applied to the functional units to produce a count value; and (g) selecting one of said single clock cycle instructions to be applied to said functional units when said count value in step (f) is less than said number in step (e) that corresponds to said one of said multiple clock cycle instructions that has been applied to the functional units.

* * * * *